US010735085B2

(12) United States Patent
Bales et al.

(10) Patent No.: US 10,735,085 B2
(45) Date of Patent: Aug. 4, 2020

(54) MULTI-CORE COMMUNICATION SYSTEM TO SERVE WIRELESS RELAYS AND USER EQUIPMENT

(71) Applicant: Sprint Communications Company L.P., Overland Park, KS (US)

(72) Inventors: Mark Richard Bales, Lee's Summit, MO (US); Lyle T. Bertz, Lee's Summit, MO (US); Chidambaram Pavanasam, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 16/166,940

(22) Filed: Oct. 22, 2018

(65) Prior Publication Data

US 2019/0058521 A1 Feb. 21, 2019

Related U.S. Application Data

(63) Continuation of application No. 15/084,759, filed on Mar. 30, 2016, now Pat. No. 10,148,340.

(51) Int. Cl.
| | |
|---|---|
| *H04B 7/155* | (2006.01) |
| *H04M 15/00* | (2006.01) |
| *H04W 60/00* | (2009.01) |
| *H04W 76/10* | (2018.01) |
| *H04W 76/25* | (2018.01) |
| *H04L 12/14* | (2006.01) |
| *H04B 7/26* | (2006.01) |
| *H04W 76/20* | (2018.01) |
| *H04W 28/02* | (2009.01) |

(Continued)

(52) U.S. Cl.
CPC ....... *H04B 7/15507* (2013.01); *H04B 7/2606* (2013.01); *H04L 12/1407* (2013.01); *H04M 15/00* (2013.01); *H04M 15/57* (2013.01); *H04M 15/66* (2013.01); *H04W 60/00* (2013.01); *H04W 76/10* (2018.02); *H04W 76/20* (2018.02); *H04W 76/25* (2018.02); *H04W 28/0268* (2013.01); *H04W 84/047* (2013.01); *H04W 88/16* (2013.01)

(58) Field of Classification Search
CPC .................................................. H04B 7/15507
See application file for complete search history.

(56) References Cited

U.S. PATENT DOCUMENTS

| | | | |
|---|---|---|---|
| 8,259,637 | B2 | 9/2012 | Bertrand et al. |
| 8,509,214 | B2 | 8/2013 | Liu et al. |

(Continued)

FOREIGN PATENT DOCUMENTS

| | | | | |
|---|---|---|---|---|
| EP | 2369892 | A1 * | 9/2011 | ............. H04B 7/155 |
| EP | 2369892 | A1 | 9/2011 | |
| WO | 2005039213 | A1 | 4/2005 | |

*Primary Examiner* — Jamaal Henson

(57) ABSTRACT

A wireless relay network to serves User Equipment (UEs). Wireless relays wirelessly attach to wireless base stations and exchange relay core signaling with relay cores. The wireless relays establish relay bearers from the wireless relays to UE cores over the wireless base stations and the relay cores. The wireless relays wirelessly attach the UEs and exchange UE core signaling with the UE cores over the relay bearers. The wireless relays establish UE bearers from the UEs to the UE cores over the relay bearers. The wireless relays exchange UE data between the UEs and the UE cores over the UE bearers.

16 Claims, 9 Drawing Sheets

(51) Int. Cl.
    *H04W 88/16*           (2009.01)
    *H04W 84/04*           (2009.01)

(56)            References Cited

U.S. PATENT DOCUMENTS

| | | | |
|---|---|---|---|
| 8,520,546 B2* | 8/2013 | Yi | H04B 7/2606 |
| | | | 370/252 |
| 8,761,073 B2 | 6/2014 | Liu et al. | |
| 8,797,940 B2 | 8/2014 | Racz et al. | |
| 9,019,841 B2 | 4/2015 | Tavildar et al. | |
| 9,036,533 B2 | 5/2015 | Liu et al. | |
| 9,077,430 B2 | 7/2015 | Han et al. | |
| 9,083,517 B2 | 7/2015 | Chen et al. | |
| 2007/0238461 A1 | 10/2007 | Lundin | |
| 2010/0046418 A1* | 2/2010 | Horn | H04W 40/22 |
| | | | 370/315 |
| 2010/0103845 A1* | 4/2010 | Ulupinar | H04L 29/12207 |
| | | | 370/254 |
| 2010/0103861 A1* | 4/2010 | Ulupinar | H04L 29/12207 |
| | | | 370/315 |
| 2010/0103864 A1* | 4/2010 | Ulupinar | H04L 29/12207 |
| | | | 370/315 |
| 2010/0202343 A1 | 8/2010 | Hunzinger et al. | |
| 2010/0265872 A1* | 10/2010 | Wu | H04B 7/15557 |
| | | | 370/315 |
| 2011/0208842 A1 | 8/2011 | Mildh et al. | |
| 2012/0039240 A1* | 2/2012 | Han | H04B 7/155 |
| | | | 370/315 |
| 2012/0044836 A1* | 2/2012 | Sivavakeesar | H04W 24/02 |
| | | | 370/255 |
| 2013/0258943 A1 | 10/2013 | Madaiah | |
| 2014/0036776 A1* | 2/2014 | Al-Shalash | H04W 40/22 |
| | | | 370/328 |
| 2014/0135008 A1 | 5/2014 | Yu et al. | |
| 2014/0301370 A1 | 10/2014 | Sivavakeesar | |
| 2016/0360563 A1* | 12/2016 | Lecroart | H04L 69/322 |
| 2017/0295535 A1* | 10/2017 | Sherman | H04J 11/0056 |

\* cited by examiner

MULTI-CORE COMMUNICATION SYSTEM TO SERVE WIRELESS RELAYS AND USER EQUIPMENT

RELATED CASES

This United States patent application is a continuation of U.S. patent application Ser. No. 15/084,759 that was filed on Mar. 30, 2016 and is entitled "MULTI-CORE COMMUNICATION SYSTEM TO SERVE WIRELESS RELAYS AND USER EQUIPMENT." U.S. patent application Ser. No. 15/084,759 is hereby incorporated by reference into this United States patent application.

TECHNICAL BACKGROUND

Data communication systems exchange user data to provide various services like media streaming, audio/video conferencing, data messaging, and internet access. The data communication systems use several communication networks to transfer the user data. In particular, the data communication systems use wireless networks to provide mobile and/or convenient access to their data services. Exemplary wireless communication protocols include Long Term Evolution (LTE) and Wireless Fidelity (WIFI). In wireless networks, the LTE and WIFI protocols typically carry the user data in Internet Protocol (IP) packets.

To implement wireless access, User Equipment (UE) and network base stations exchange wireless signals that transport user data and network signaling. The base stations communicate with a core network over backhaul links. The core network includes various gateways, control systems, and user databases. The core network interacts with the UEs and the wireless base stations to deliver data services at the appropriate quality.

To extend the wireless access, wireless relays are deployed between the UEs and the wireless base stations. The wireless relays exchange the user data and network signaling between the UEs and the network base stations. The wireless relays also generate and consume their own network signaling. To optimize wireless relay operations, separate network cores for wireless relays are installed. Thus, the wireless relays serve the UEs which are served from a UE network core, but the wireless relays are served from a different relay network core.

Unfortunately, current multi-core data communication systems are neither efficient nor effective when using wireless relays. In particular, the interactions between the multiple network cores, the wireless relays, and the UEs is not adequate to support complex services like voice and video.

TECHNICAL OVERVIEW

A wireless relay network to serves User Equipment (UEs). Wireless relays wirelessly attach to wireless base stations and exchange relay core signaling with relay cores. The wireless relays establish relay bearers from the wireless relays to UE cores over the wireless base stations and the relay cores. The wireless relays wirelessly attach the UEs and exchange UE core signaling with the UE cores over the relay bearers. The wireless relays establish UE bearers from the UEs to the UE cores over the relay bearers. The wireless relays exchange UE data between the UEs and the UE cores over the UE bearers.

DETAILED DESCRIPTION

Figure 1:
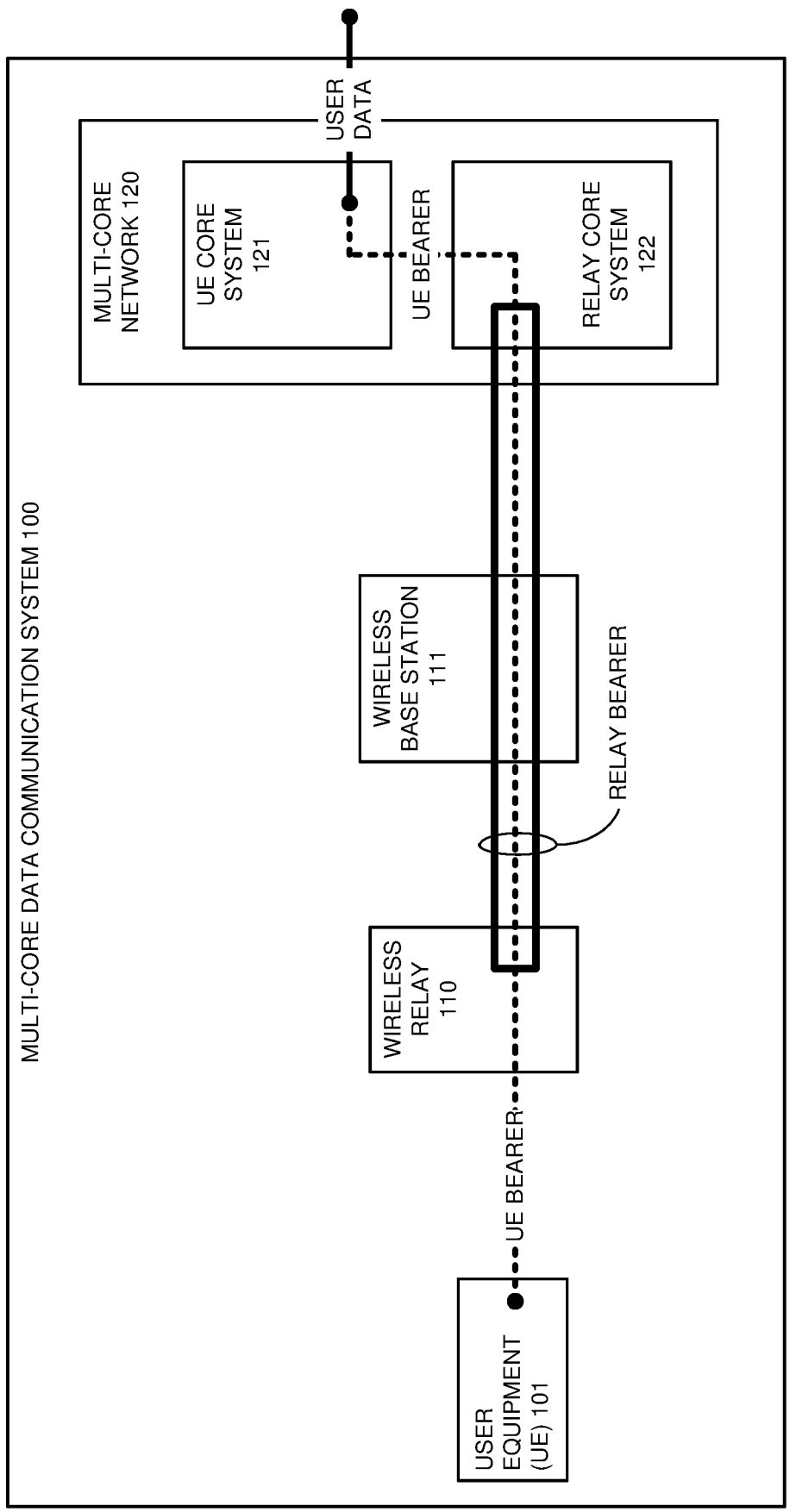
FIG. 1 illustrates a multi-core data communication system to serve wireless relays from a relay core system and to serve wireless User Equipment (UE) from a UE core system.

FIG. 1 illustrates multi-core data communication system 100 to serve wireless relay 110 from relay core system 122 and to serve wireless User Equipment (UE) 101 from UE core system 121. Multi-core data communication system 100 comprises: UE 101, wireless relay 110, wireless base station 111, and multi-core network 120. Multi-core network 120 comprises UE core system 121 and relay core system 122.

UE 101 comprises a phone, computer, server, or some other machine with an intelligent communication transceiver. Wireless base station 111 comprises a Long Term Evolution (LTE) evolved Node B (eNodeB), Wireless Fidelity (WIFI) hotspot, LTE/WIFI Aggregation (LWA) access point, or some other type of wireless data hub. Wireless relay 110 comprises base station components to interface with UE 101 and UE components to interface with wireless base station 111. UE core system 121 and relay core system 122 each comprise network gateways, routers, network controllers, user databases, and the like.

Initially, wireless relay 110 attaches to relay core system 122 over wireless base station 111. Relay core system 122 establishes a relay bearer between wireless relay 110 and relay core system 122 over wireless base station 111. In some examples, the relay bearer comprises a default LTE data bearer for wireless relay 110.

After relay attachment, UE 101 and wireless relay 110 exchange wireless attachment signaling. Wireless relay 110 responsively transfers a wireless attachment message over relay core system 122 to UE core system 121. The wireless attachment message indicates the UE ID, the Relay ID, and the Relay Core ID. UE core system 121 receives the wireless attachment message and establishes a UE bearer between UE 101 and UE core system 121. The UE bearer traverses the relay bearer between wireless relay 110 and relay core system 122. In some examples, the UE bearer comprises a default LTE data bearer for UE 101.

Wireless relay 110 eventually receives a wireless data request from UE 101. Wireless relay 110 responsively transfers a UE data request to UE core system 121. The UE data request indicates a UE Identifier (ID), a Relay ID, and a Relay Core ID. The UE ID and the relay ID may be International Mobile Subscriber Identifiers (IMSIs), International Mobile Equipment Identifiers (IMEIs), serial numbers, device names, network addresses, and the like. The relay core ID may be an Access Point Name (APN), relay network name, relay network address, and the like. For example, wireless relay 110 may transfer an S1-MME service request with the UE ID, Relay ID, and Relay Core ID to a Mobility Management Entity (MME) in UE core system 121. UE core system 121 receives the data request and modifies the UE bearer between UE 101 and wireless relay 110 and between UE core system 121 and relay core system 122.

In response to the data request, UE core system 121 transfers a core-to-core message indicating the Relay ID to relay core system 122. Relay core system 122 receives the core-to-core message. For example, a Policy Charging and Rules Function (PCRF) in UE core system 121 may transfer an S9 bearer instruction to a PCRF in relay core system 122 that indicates the UE and relay IMSIs and a Quality-of-Service Class Identifier (QCI) for the relay bearer. In response to the core-to-core message, relay core system 122 transfers a base station message that directs wireless base station 111 to modify the relay bearer between wireless relay 110 and relay core system 122. Relay core system 122 also modifies the relay bearer through its own gateways.

UE 101 and wireless relay 110 exchange user data over the modified UE bearer. Wireless relay 110 and wireless base station 111 exchange the user data over the UE bearer that traverses the modified relay bearer. Wireless base station 111 and relay core system 122 exchange the user data over the UE bearer that traverses the modified relay bearer. Relay core system 122 and UE core system 121 exchange the user data with over the modified UE bearer. UE core system 121 typically exchanges the user data with other core systems or with external systems.

Figure 2:
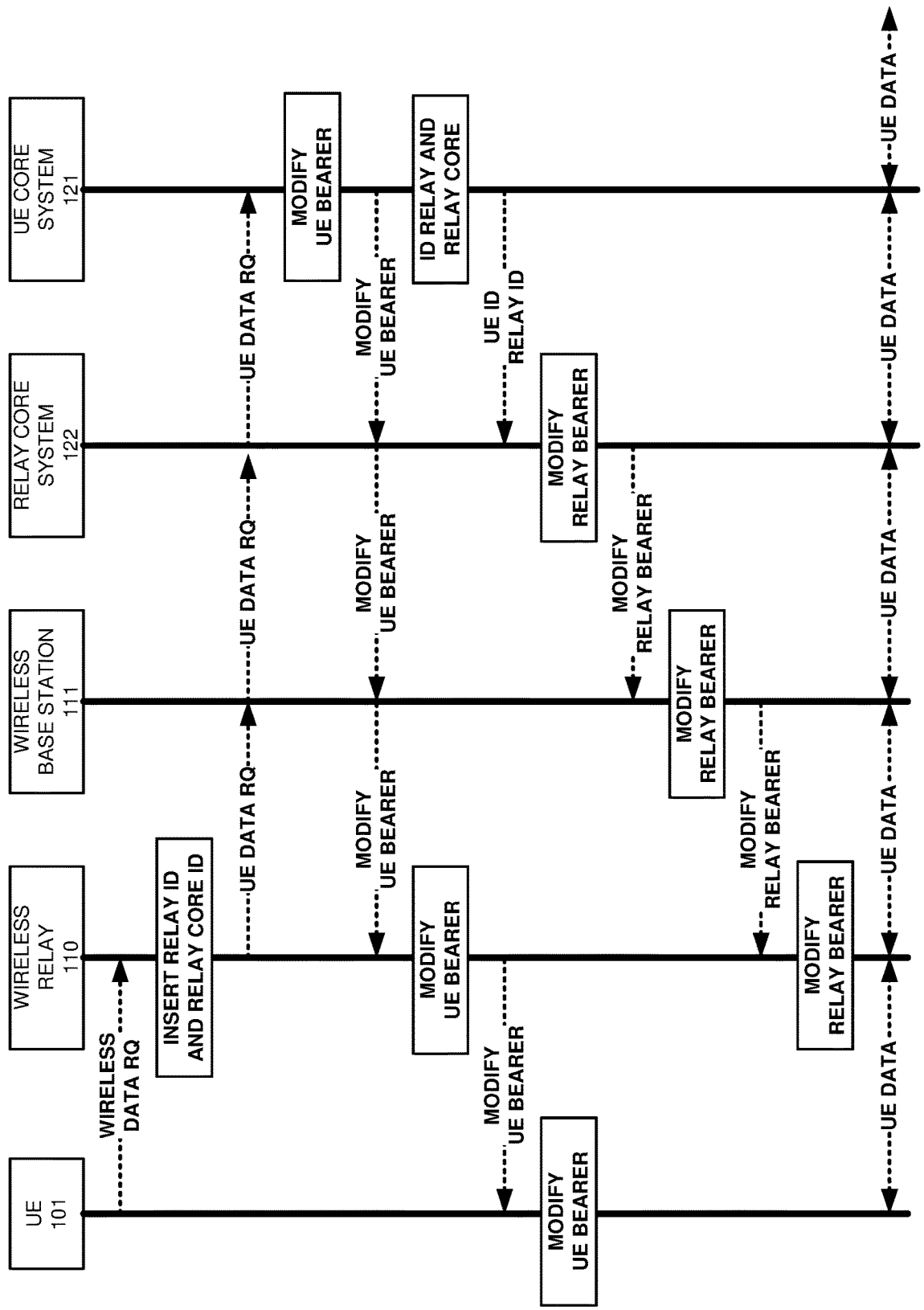
FIG. 2 illustrates the operation of the multi-core data communication system to serve a UE from a UE core system through a relay core system.

FIG. 2 illustrates the operation of multi-core data communication system 100 to serve UE 101 from UE core system 121 through relay core system 122. Wireless relay 110 receives a wireless data request from UE 101. Wireless relay 110 inserts a Relay ID and Relay Core ID into the signaling flow. Wireless relay 110 transfers a UE data request to UE core system 121 that indicates the UE ID, Relay ID, and Relay Core ID. The UE data request traverses wireless base station 111 and relay core system 122.

UE core system 121 receives the UE data request and modifies the UE bearer between core systems 121-122. UE core system 121 transfers a modify UE bearer instruction to wireless relay 110. The modify bearer instruction traverses relay core system 121 and wireless base station 111. Wireless relay 110 receives the modify UE bearer instruction, modifies the UE bearer, and transfers a UE message to UE 101 to modify the UE bearer. UE 101 receives the modify UE message and modifies the UE bearer.

UE core system 121 also identifies the Relay ID and the Relay Core ID in the UE data request. In response to these relay and core IDs, UE core system 121 transfers a core-to-core message indicating the UE ID and the Relay ID to relay core system 122. Relay core system 122 receives the core-to-core message and responsively modifies the relay bearer that serves the UE between wireless base station 111 and a relay core gateway. Relay core system 122 also responsively transfers a base station message that directs wireless base station 111 to modify the relay bearer. Wireless base station 111 receives the base station message, modifies the relay bearer, and transfers a UE message that directs wireless relay 110 to modify the relay bearer. Wireless relay 110 receives the UE message and modifies the relay bearer that serves UE 101.

UE 101 and wireless relay 110 exchange user data over the modified UE bearer. Wireless relay 110 and wireless base station 111 exchange the user data over the over the UE bearer that traverses the modified relay bearer. Wireless base station 111 and relay core system 122 exchange the user data over the UE bearer that traverses the modified relay bearer. Relay core system 122 and UE core system 121 exchange the user data over the modified UE bearer. UE core system 121 exchanges the user data with other systems.

Figure 3:
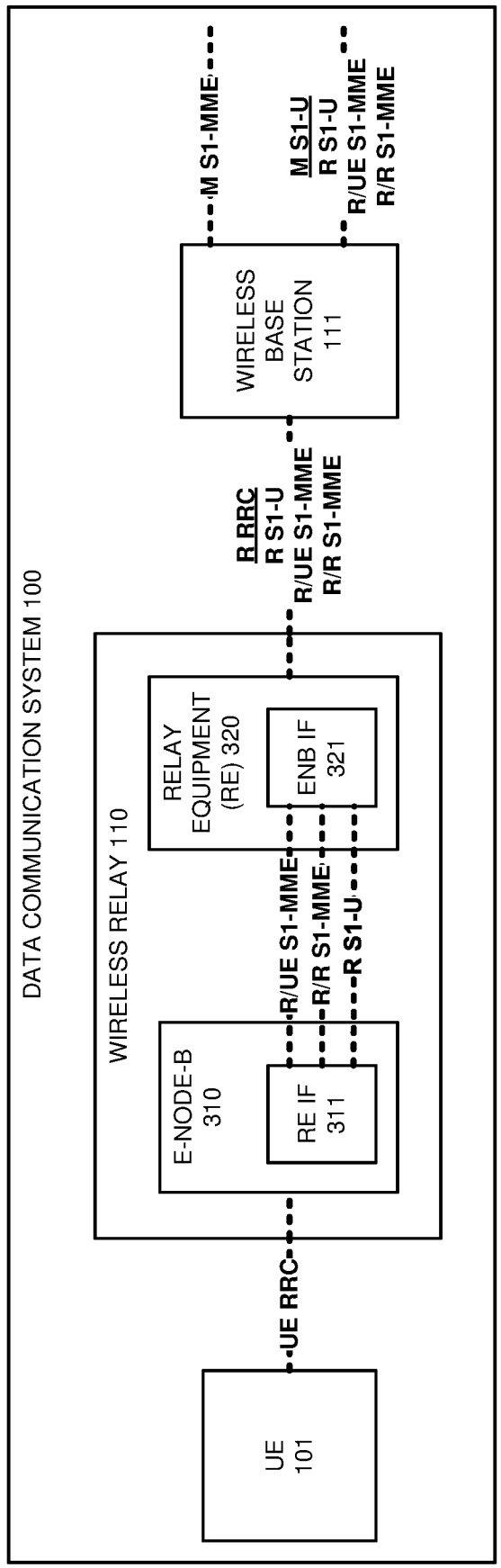
FIG. 3 illustrates a wireless relay to serve a UE from a UE core system through a relay core system.

FIG. 3 illustrates wireless relay 110 to serve UE 101 from UE core system 121 over relay core system 122. Wireless relay 110 comprises eNodeB 310 and Relay Equipment (RE) 320. eNodeB 310 has an RE Interface (IF), and RE 320 has an eNodeB (ENB) IF 321. RE 320 and ENB IF 321 exchange relay S1-MME signaling for UE core system 121 (R/UE S1-MME). RE 320 and ENB IF 321 exchange relay S1-MME signaling for relay core system 121 (R/R S1-MME). RE 320 and ENB IF 321 exchange user data over a relay link (R S1-U).

UE 101 and eNodeB 310 exchange wireless UE Radio Resource Control (UE RRC) signals that transport both user data and network signaling. In a like manner, RE 320 and wireless base station 111 exchange wireless relay RRC (R RRC) signals that transport both user data (R S1-U) and network signaling (S1-MME). The S1-MME signaling includes both Relay-to-Relay Core (R/R) and Relay-to-UE core (R/UE) S1-MME signaling. Wireless base station 111 and relay core system 122 exchange Macro S1-U (M S1-U) user data. The M S1-U data transports the R S1-U user data, R/UE S1-MME signaling, and R/R S1-MME signaling. Wireless base station 111 exchanges its own Macro S1-MME (M S1-MME) signaling with relay core system 122.

When RE 320 attaches to wireless base station 111, wireless base station 111 establishes a relay bearer over the R RRC/R S1-U and M S1-U/R S1-U links. These RRC and S1-U links may be the default LTE data bearer for RE 320. After RE attachment, UE 101 and eNodeB 310 exchange UE RRC attachment signals. eNodeB 310 responsively transfers a R/UE S1-MME attachment message to UE core system 121. The R/UE S1-MME message indicates the UE ID, Relay ID, and Relay Core ID. The resulting UE bearer between UE 101 and UE core system 121 traverses the UE RRC, R RRC/R S1-U, and M S1-U/R S1-U links. The UE bearer may comprise a default LTE data bearer for UE 101.

After UE attachment, eNodeB 310 receives a wireless data request from UE 101. eNodeB 310 responsively transfers a R/UE S1-MME service request to UE core system 121. The R/UE S1-MME service request indicates the UE ID, Relay ID, and Relay Core ID. An R/UE S1-MME service instruction from UE core system 121 to eNodeB 310 modifies the UE bearer over the UE RRC link to UE 101. An M S1-MME instruction from relay core system 121 to wireless base station 111 modifies the relay bearer (R S1-U) that traverses the R RRC link to RE 320 and the M S1-U link to relay core system 122. RE IF 311 and ENB IF 321 modify the UE bearer (R S1-U) and insert the modified UE bearer from UE 101 into the modified relay bearer (R RRC) for RE 320.

UE 101 and eNodeB 310 exchange user data over the modified UE bearer (UE RRC). eNodeB 310 and RE 320 exchange the user data over the modified UE bearer (R S1-U). RE 320 and wireless base station 111 exchange the user data over the modified relay bearer (R RRC/R S1-U). Wireless base station 111 and relay core system 122 exchange the user data over the modified UE bearer (M S1-U/R S1-U).

Figure 4:
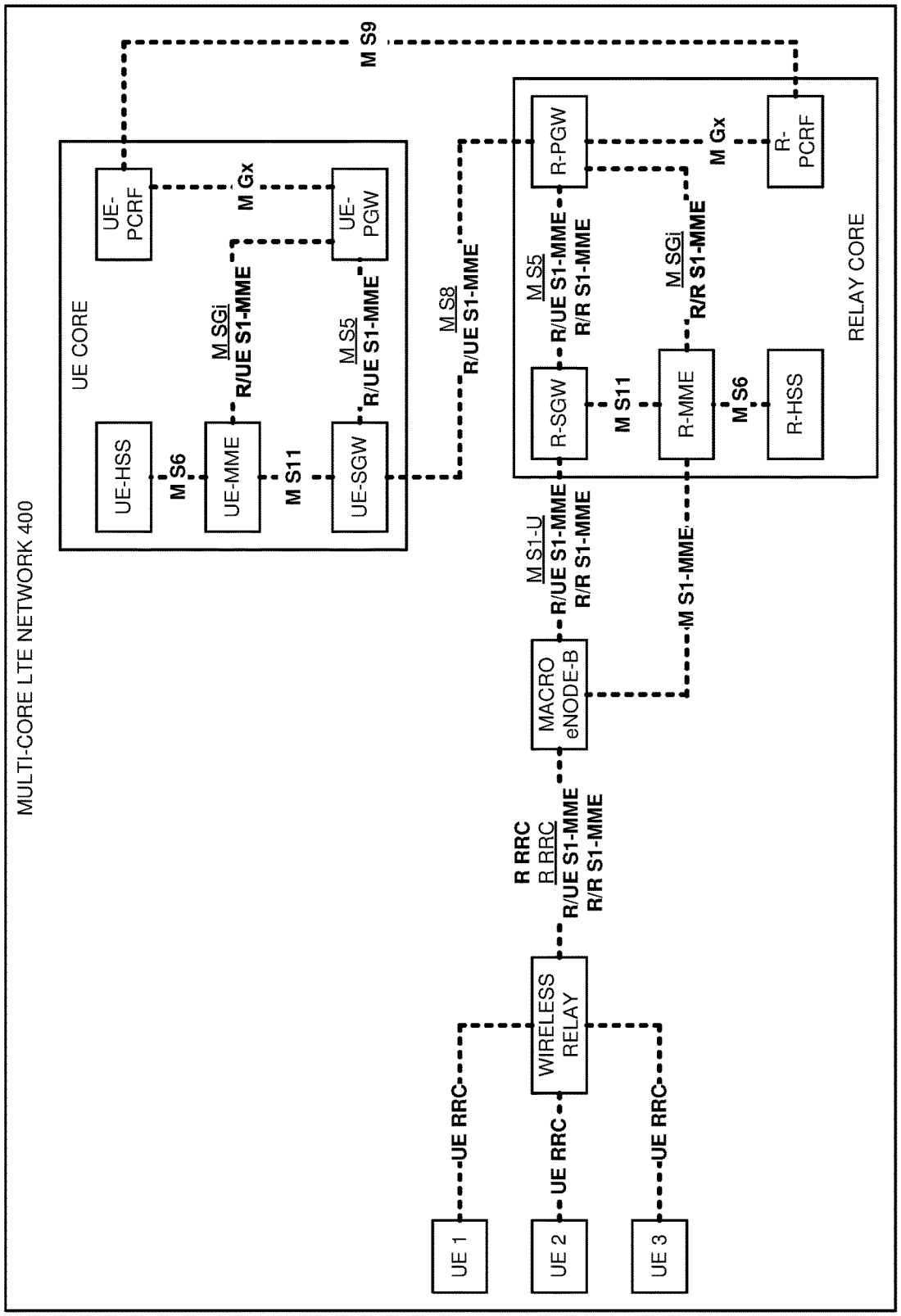
FIG. 4 illustrates signaling interfaces for a multi-core Long Term Evolution (LTE) Network that serves a wireless relay from a relay core and serves User Equipment (UEs) from a UE core.

FIGS. 4-9 illustrate multi-core Long Term Evolution (LTE) Network 400 to serve UEs 1-3 from a UE core over a relay core. FIG. 4 illustrates the signaling interfaces for LTE network 400. LTE Network 400 is an example of data communication system 100, although system 100 may use alternative configurations and operations. LTE network 400 comprises UEs 1-3, wireless relay, macro-eNodeB, relay core, and UE core. The relay core comprises: Relay Serving Gateway (R-SGW), Relay Mobility Management Entity (R-MME), Relay Home Subscriber System (R-HSS), Relay Packet Data Network Gateway (R-PGW), and Relay Policy Charging and Rules Function (R-PCRF). The UE core comprises: UE-SGW, UE-MME, UE-HSS, UE-PGW, and UE-PCRF.

UEs 1-3 and the wireless relay communicate over UE RRC signaling links. The wireless relay and the macro-eNodeB communicate over a Relay RRC (R RRC) data link that carries R/UE S1-MME and R/R S1-MME signaling links. The R RRC also exchanges signaling between the wireless relay and the macro eNodeB. The macro-eNodeB and the R-MME communicate over a Macro S1-MME (M S1-MME) signaling link. The macro-eNodeB and the R-SGW communicate over an M S1-U data link that carries the R/UE S1-MME and R/R S1-MME signaling links.

The R-SGW and the R-PGW communicate over an M S5 data link that transports the R/UE S1-MME and R/R S1-MME signaling links. The R-PGW and the R-MME communicate over an M SGi data link that carries the R/R S1-MME signaling link. The R-SGW and the R-MME communicate over an M S11 signaling link. The R-MME and the R-HSS communicate over an M S6 signaling link. The R-PGW and the R-PCRF communicate over an M Gx signaling link.

The UE-SGW and the UE-PGW communicate over an M S5 data link that transports the R/UE S1-MME signaling link. The UE-PGW and the UE-MME communicate over an M SGi data link that carries the R/UE S1-MME signaling link. The UE-SGW and the UE-MME communicate over an M S11 signaling link. The UE-MME and the UE-HSS communicate over an M S6 signaling link. The UE-PGW and the UE-PCRF communicate over an M Gx signaling link. The UE-PCRF and the R-PCRF communicate over an M S9 signaling link.

Figure 5:
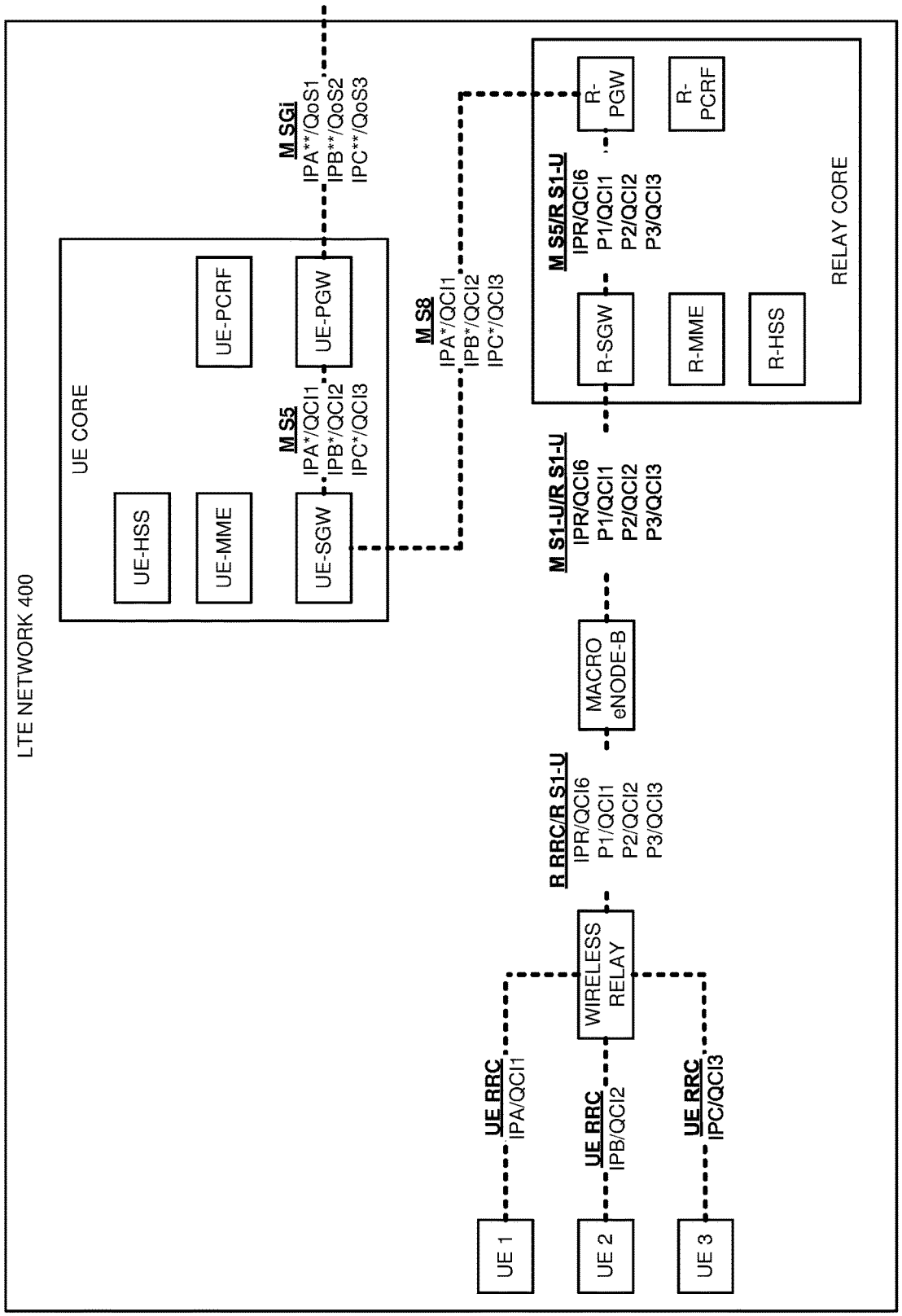
FIG. 5 illustrates user data interfaces and Internet Protocol (IP) addressing for the multi-core LTE Network.

FIG. 5 illustrates the user data links and an exemplary Internet Protocol addressing scheme for multi-core LTE network 400. UEs 1-3 and the wireless relay communicate over UE RRC data links. The UE bearers on these links use respective IP addresses A, B, and C along with corresponding QCIs 1, 2, and 3. Note that the QCIs are exemplary, and various QCI combinations could be used by UEs 1-3.

The wireless relay and the macro-eNodeB communicate over an R RRC data link that carries R S1-U user data. The R RRC link is the relay bearer and may use QCI6 or some other QoS. The UE bearers use the relay bearer on the R RRC data link. The wireless relay performs Network Address and Port Translation (NAPT) between IP addresses and IP ports. In the relay bearer, the UE bearers use the Relay IP address (IPR) and relay ports P1, P2, and P3 for respective UE IP addresses A, B, and C. P1, P2, and P3 for IPR use respective QCIs 1, 2, and 3.

The macro-eNodeB and the R-SGW communicate over an M S1-U data link that carries the R S1-U data link. The M S1-U link is the relay bearer and may use QCI6 or some other QoS. The UE bearers use the relay bearer on the M S1-U data link. The UE bearers use IPR, P1, P2, and P3 for respective UE IP addresses A, B, and C and use respective QCIs 1, 2, and 3. The R-SGW and the R-PGW communicate over an M S5 data link that transports the R S1-U data link. The UE bearers again use the QCI 6 relay bearer and again use IPR, P1, P2, and P3 for respective IP addresses A, B, and C and QCIs 1, 2, and 3.

The R-PGW and the UE-SGW communicate over an M S8 data link. The R-PGW also performs NAPT. Thus, the UE bearers on the M S8 data link use IP addresses A', B', and C' for respective IPR/P1, IPR/P2, and IPR/P3. IP address A', B', and C' use respective QCIs 1, 2, and 3. The UE-SGW and the UE-PGW communicate over an M S5 data link that uses IP addresses A', B', and C' and respective QCIs 1, 2, and 3. The UE-PGW and other systems communicate over M SGi data links. The UE-PGW performs NAPT. Thus, the UE bearers on the M SGi links use IP addresses A", B", and C" for IP addresses A', B', and C'. The UE bearers on the M SGi links use QoS 1, 2, and 3 that may correspond to QCIs 1, 2, and 3.

Figure 6:
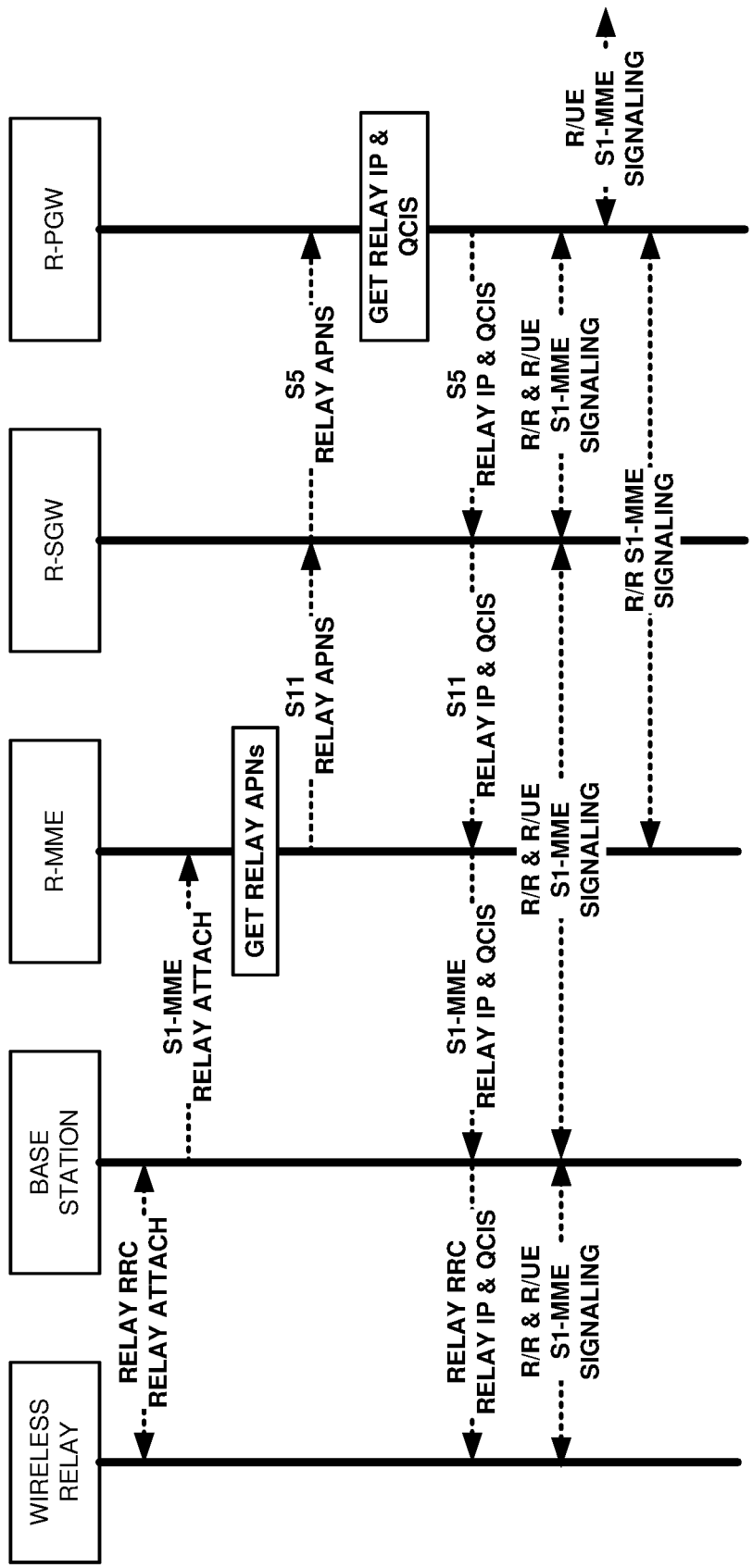
FIG. 6 illustrates wireless relay attachment in the multi-core LTE Network.

FIG. 6 illustrates wireless relay attachment in multi-core LTE Network 400. Initially, the wireless relay exchanges RRC attachment signaling with the wireless base station. The wireless base station responsively transfers an S1-MME attachment message to the R-MME. The R-MME accesses the R-HSS to authorize the wireless relay and get relay Access Point Names (APNs). The R-MME transfers an S11 session request with the relay APNs to the R-SGW, and the R-SGW sends an S5 session request with the relay APNs to the R-PGW.

The R-PGW accesses the R-PCRF to get relay QCIs for the relay APNs. Exemplary APNs and QCIs for the wireless relay might be APN DATA at QCI 6 and APN SIG at QCI 5. The R-PGW also issues an IP address (IPR) to the wireless relay. The R-PGW returns an S5 session response having the relay QCIs and IP address to the R-SGW. The R-SGW transfers an S11 session response having the relay QCIs and IP address to the R-MME. The R-MME transfers an S1-MME service response having the relay QCIs and IP address to the wireless base station. The wireless base station transfers an RRC service response having the relay QCIs and IP address to the wireless relay. The wireless relay may now exchange Relay-to-Relay core (R/R) S1-MME signaling with the R-MME. The wireless relay may also exchange Relay-to-UE core (R/UE) S1-MME signaling with the UE-MME.

Figure 7:
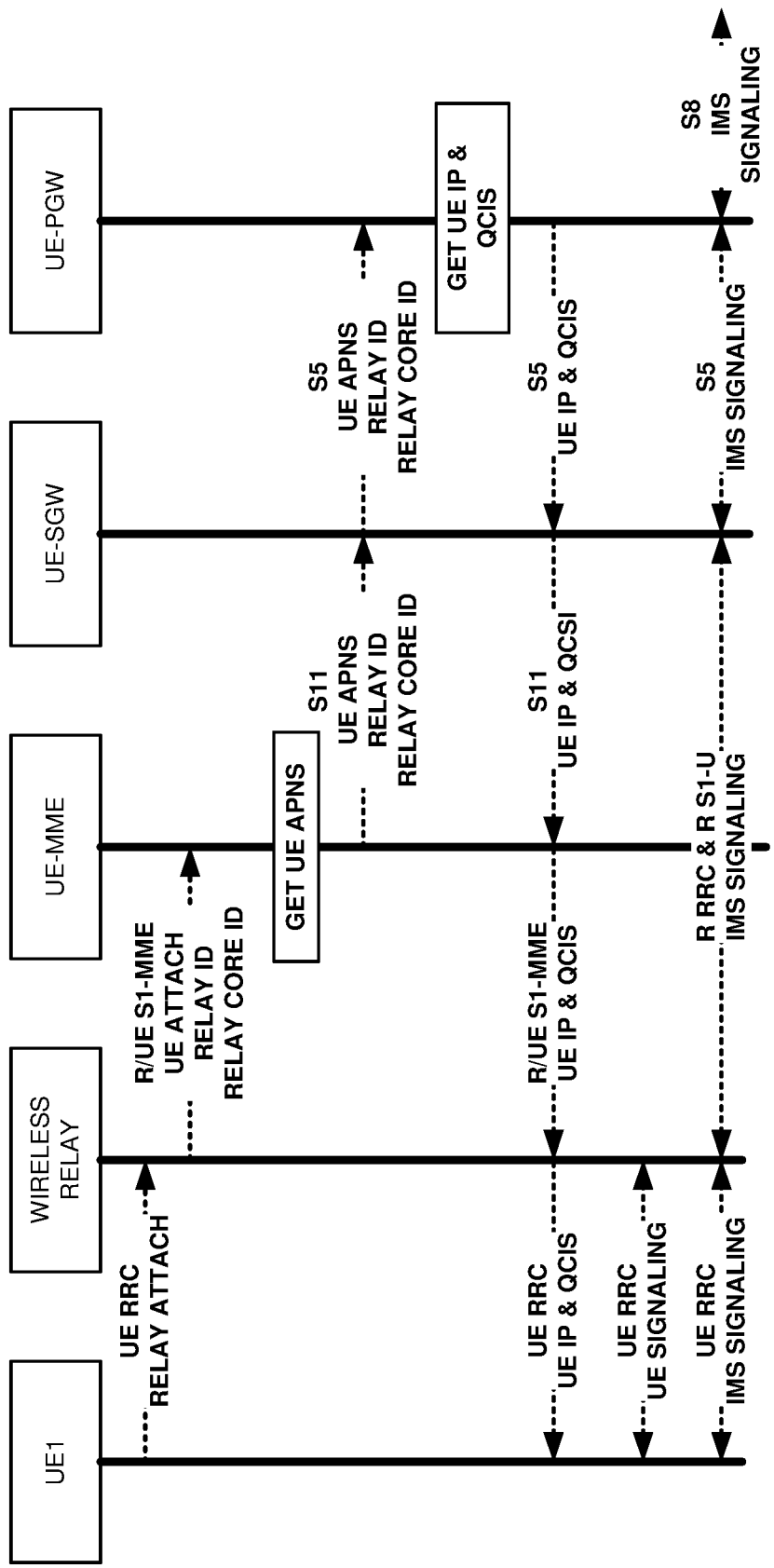
FIG. 7 illustrates wireless UE attachment in the multi-core LTE Network.

FIG. 7 illustrates wireless UE attachment in multi-core LTE Network 400. UE1 exchanges UE RRC attachment signaling with the wireless relay. The wireless relay responsively transfers an R/UE S1-MME attachment message having the UE ID, relay ID, and relay core ID to the UE-MME. The UE-MME accesses the UE-HSS to authorize UE1 and get UE APNs. The UE-MME transfers an S11 session request to the UE-SGW, and the UE-SGW sends an S5 session request to the UE-PGW. These S11 and S5 session requests include the UE APNs, UE ID, relay ID, and relay core ID.

The UE-PGW accesses the UE-PCRF to get UE QCIs for the UE APNs. Exemplary APNs and QCIs for UE1 might be APN DATA at QCI 9 and APN IMS at QCI 5. The UE-PGW also issues an IP address (IPA) to UE1. The UE-PGW returns an S5 session response having the UE QCIs and IP address to the UE-SGW. The UE-SGW transfers an S11 session response having the UE QCIs and IP address to the UE-MME. The UE-MME transfers an R/UE S1-MME service response having the UE QCIs and IP address to the wireless relay. The wireless relay transfers a UE RRC service response having the UE QCIs and IP address to UE1. UE1 may now exchange signaling with the wireless relay (and the wireless relay may exchange the R/UE S1-MME signaling for UE1 with the UE-MME). UE1 may also exchange signaling with external systems like an Internet Protocol Multimedia Subsystem (IMS) or the like.

Figure 8:
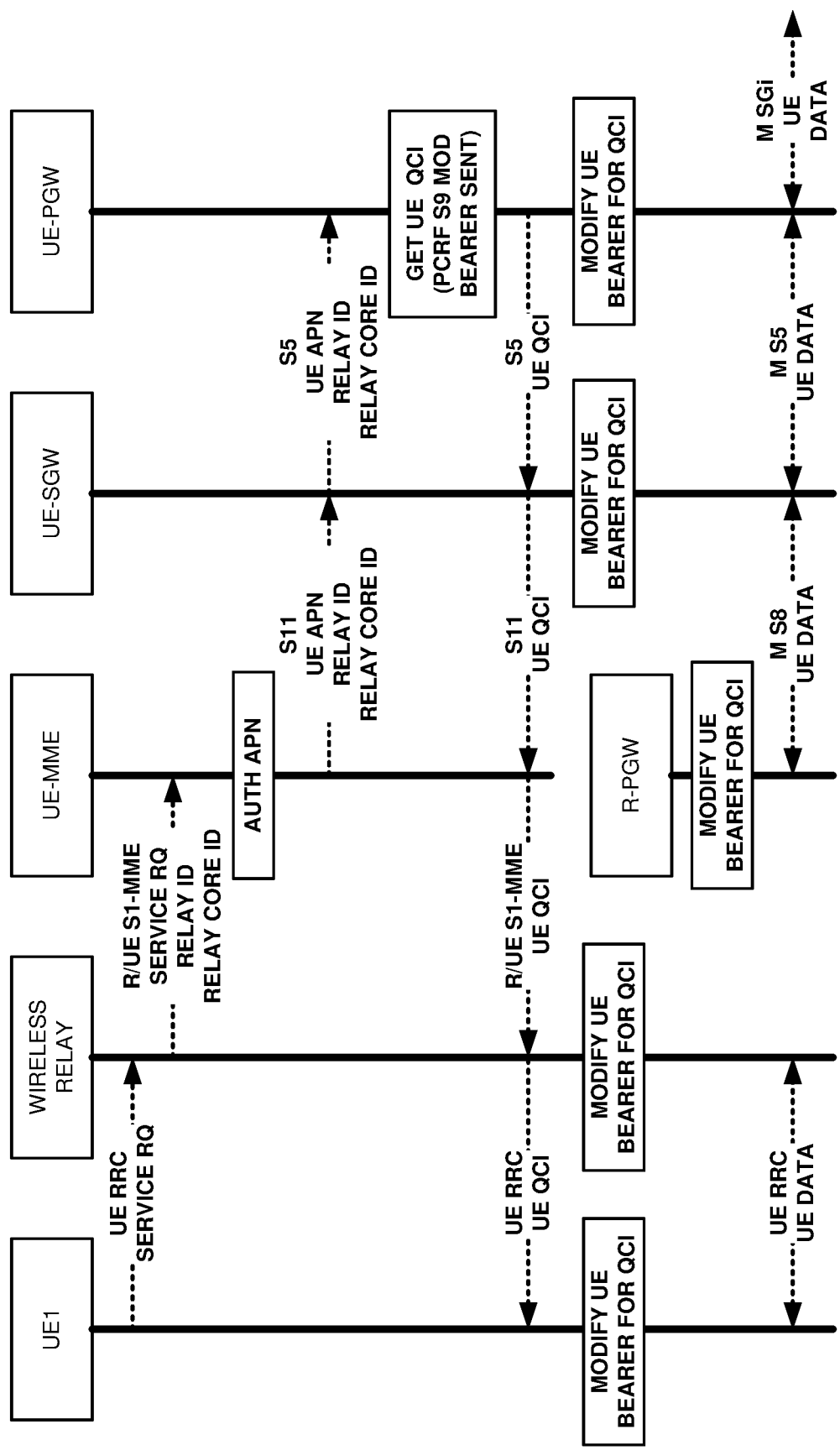
FIG. 8 illustrates a UE service request and UE bearer modification in the multi-core LTE Network.

FIG. 8 illustrates a UE service request and UE bearer modification in multi-core LTE Network 400. UE1 transfers a UE RRC service request to the wireless relay. For example, UE1 may be adding a voice, video, gaming, or other data bearer responsive to an IMS session. The wireless relay responsively transfers an R/UE S1-MME service request having the UE ID, UE APN, relay ID, and relay core ID to the UE-MME. The UE-MME accesses the UE-HSS to authorize the UE APN. The UE-MME then transfers an S11 session request to the UE-SGW, and the UE-SGW sends an S5 session request to the UE-PGW. These S11 and S5 session requests include the UE APN, UE ID, relay ID, and relay core ID.

The UE-PGW accesses the UE-PCRF to get the UE QCI for the UE APN. Exemplary APNs and QCIs for UE1 might be APN VOLTE at QCI 1 and APN VIDEO at QCI 2. The UE-PGW returns an S5 session response having the UE QCI to the UE-SGW. The UE-SGW transfers an S11 session response having the UE QCI to the UE-MME. Although not shown for clarity, the UE-MME returns an S11 modify bearer instruction having the UE QCI to the UE-SGW, and the UE-S-GW sends an S5 modify bearer request for the UE QCI to the UE-PGW. The UE-MME transfers an R/UE S1-MME service response having the UE QCI to the wireless relay. The wireless relay transfers a UE RRC service response having the UE QCI to UE1. In response to this message sequence, UE1, wireless relay, UE-SGW, and UE-PGW modify the UE bearer to support the UE QCI. The UE-SGW directs the R-PGW to modify the UE bearer.

When the UE-PGW accesses the UE-PCRF to get the UE QCI for the UE APN, the UE-PGW indicates the Relay ID and the Relay core ID through a Via Attribute Value Pair (AVP). Although note shown here for clarity, the UE-PCRF identifies the Via AVP and responsively transfers an S9 message to the R-PCRF that indicates the Relay ID, UE ID, UE APN, and UE QCI. The R-PCRF directs the R-PGW to modify the relay bearer based on the Relay ID, UE ID, UE APN, and UE QCI. This operational sequence is described further below.

UE1 may now exchange UE RRC user data with the wireless relay using the UE QCI. The R-PGW exchanges the user data using the UE QCI over the M S8 data link with the UE-SGW. The UE-SGW exchanges the user data using the QCI over the M S5 data link with the UE-PGW. The UE-PGW exchanges the user data using a QCI-like QoS over the M SGi data link to another system.

Figure 9:
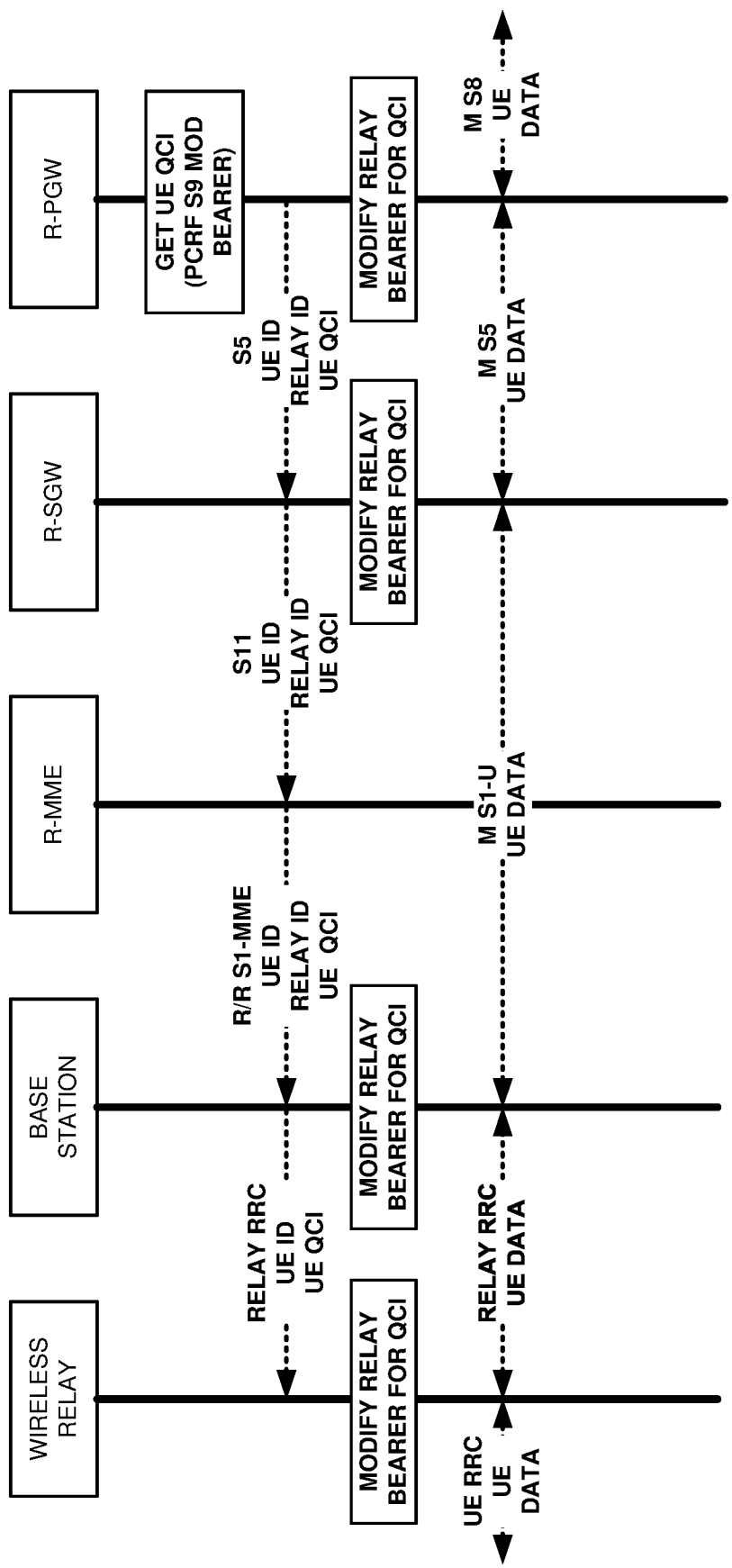
FIG. 9 illustrates the UE service request and relay bearer modification in the multi-core LTE Network.

FIG. 9 illustrates the UE service request and relay bearer modification in multi-core LTE Network 400. Although note shown here for clarity, the UE-PCRF previously identified the relay ID and relay core ID and responsively sent the S9 message to the R-PCRF that indicated the Relay ID, UE ID, UE APN, and UE QCI. The R-PCRF then directed the R-PGW to modify the relay bearer based on the Relay ID, UE ID, and UE QCI.

The R-PGW sends an S5 modify bearer request having the UE ID, Relay ID, and UE QCI to the R-SGW. The R-SGW transfers an S11 modify bearer request having the UE ID, Relay ID, and UE QCI to the R-MME. The R-MME transfers an R/R S1-MME service response having the Relay ID, UE ID, and UE QCI to the wireless base station. The wireless base station transfers a Relay RRC modify bearer request having the UE ID and UE QCI to the wireless relay. Although note shown here for clarity, the R-MME also returns an S11 modify bearer instruction having the UE QCI to the R-SGW, and the UE-S-GW sends an S5 modify bearer request for the UE QCI to the UE-PGW. In response to this message sequence, the wireless relay, wireless base station, R-SGW, and R-PGW modify the relay bearer to support the UE QCI.

The wireless relay now exchanges user data with UE1 using the UE QCI. The wireless relay and the wireless base station exchange the user data using the UE QCI over the R RRC data link. The wireless base station and the R-SGW exchange the user data using the UE QCI over the M S1-U data link. The R-SGW and the R-PGW exchange the user data using the UE QCI over the M S5 data link. The R-PGW and the UE-SGW exchange the user data using the UE QCI over the M S8 data link. The user data exchange through the UE core is described above.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless relay network to serve a User Equipment (UE), the method comprising:
   a wireless relay wirelessly attaching to a wireless base station and exchanging relay core signaling with a relay core over the wireless base station, and in response, the wireless relay and the relay core establishing a relay bearer from the wireless relay to a UE core;
   the wireless relay wirelessly attaching the UE and exchanging UE core signaling with the UE core over the relay bearer, and in response, the wireless relay and the UE core establishing a UE bearer from the UE to the UE core over the relay bearer;
   the wireless relay receiving a data request from the UE and responsively transferring a UE request to the UE core that indicates the UE, the wireless relay, and the relay core;
   the UE core receiving the UE request and responsively modifying the UE bearer and transferring a relay request to the relay core to modify the relay bearer;
   the relay core receiving the relay request and responsively modifying the relay bearer for the wireless relay to serve the UE; and
   the wireless relay, the relay core, and the UE core exchanging user data for the UE over the modified UE bearer using the modified relay bearer.

2. The method of claim 1 wherein the wireless relay transferring the UE request to the UE core comprises transferring the UE request to the UE core that indicates the UE, the wireless relay, the relay core, and the relay bearer.

3. The method of claim 1 wherein the wireless relay wirelessly attaching to the wireless base station comprises the wireless relay wirelessly exchanging Radio Resource Control (RRC) signaling with the wireless base station.

4. The method of claim 1 wherein the wireless relay wirelessly attaching the UE comprises the wireless relay wirelessly exchanging Radio Resource Control (RRC) signaling with the UE.

5. The method of claim 1 wherein the wireless relay exchanging the relay core signaling comprises the wireless relay exchanging S1-MME signaling.

6. The method of claim 1 wherein the wireless relay exchanging the UE core signaling comprises the wireless relay exchanging S1-MME signaling.

7. The method of claim 1 wherein the relay bearer comprises a Radio Resource Control (RRC) bearer coupled to an S1-U bearer coupled to an S5 bearer coupled to an S8 bearer.

8. The method of claim 1 wherein the UE bearer comprises a UE Radio Resource Control (RRC) bearer coupled to a relay RRC bearer coupled to a relay S1-U bearer coupled to a relay S5 bearer coupled to a relay S8 bearer coupled to a UE S5 bearer coupled to a UE SGi bearer.

9. A wireless relay network to serve User Equipment (UEs) comprising:
- a wireless relay configured to wirelessly attach to a wireless base station and exchange relay core signaling with a relay core over the wireless base station, and in response, the wireless relay and the relay core configured to establish a relay bearer from the wireless relay to a UE core over the wireless base station and the relay core;
- the first wireless relay configured to wirelessly attach the UE and exchange UE core signaling with the UE core over the relay bearer, and in response, the wireless relay configured to establish a UE bearer from the UE to the UE core over the relay bearer;
- the wireless relay configured to
- receive a data request from the UE and responsively transfer a UE request to the UE core that indicates the UE, the wireless relay, and the relay core;
- the UE core configured to receive the UE request and responsively modify the UE bearer and transfer a relay request to the relay core to modify the relay bearer;
- the relay core configured to receive the relay request and responsively modify the relay bearer for the wireless relay to serve the UE; and
- the wireless relay, the relay core, and the UE core configured to exchange user data for the UE over the modified UE bearer using the modified relay bearer.

10. The wireless relay network of claim 9 wherein: the UE request indicates the relay bearer.

11. The wireless relay network of claim 9 wherein: the wireless relay is configured to wirelessly exchange Radio Resource Control (RRC) signaling when attaching to the wireless base station.

12. The wireless relay network of claim 9 wherein: the wireless relay is configured to wirelessly exchange Radio Resource Control (RRC) signaling when attaching the UE.

13. The wireless relay network of claim 9 wherein the relay core signaling comprises S1-MME signaling.

14. The wireless relay network of claim 9 wherein the UE core signaling comprises S1-MME signaling.

15. The wireless relay network of claim 9 wherein the relay bearer comprises a Radio Resource Control (RRC) bearer coupled to an S1-U bearer coupled to an S5 bearer coupled to an S8 bearer.

16. The wireless relay network of claim 9 wherein the UE bearer comprises a UE Radio Resource Control (RRC) bearer coupled to a relay RRC bearer coupled to a relay S1-U bearer coupled to a relay S5 bearer coupled to a relay S8 bearer coupled to a UE S5 bearers coupled to a UE SGi bearer.

* * * * *